(12) United States Patent
Kawada

(10) Patent No.: US 10,708,485 B2
(45) Date of Patent: Jul. 7, 2020

(54) IMAGE CAPTURING APPARATUS, LENS APPARATUS, AND DATA COMMUNICATION PROCESS PROGRAM

(71) Applicant: CANON KABUSHIKI KAISHA, Tokyo (JP)

(72) Inventor: Kazutoshi Kawada, Utsunomiya (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 15/568,556

(22) PCT Filed: Jun. 21, 2016

(86) PCT No.: PCT/JP2016/002988
§ 371 (c)(1),
(2) Date: Oct. 23, 2017

(87) PCT Pub. No.: WO2017/002327
PCT Pub. Date: Jan. 5, 2017

(65) Prior Publication Data
US 2018/0115697 A1   Apr. 26, 2018

(30) Foreign Application Priority Data
Jul. 2, 2015   (JP) .................................. 2015-133759

(51) Int. Cl.
*H04N 5/225*   (2006.01)
*H04N 5/232*   (2006.01)
(Continued)

(52) U.S. Cl.
CPC ........... *H04N 5/23209* (2013.01); *G03B 7/20* (2013.01); *G03B 17/14* (2013.01);
(Continued)

(58) Field of Classification Search
None
See application file for complete search history.

(56) References Cited

U.S. PATENT DOCUMENTS 4,529,288 A * 7/1985 Nakai .................... G03B 7/095
396/227
5,485,208 A   1/1996 Mabuchi et al.
(Continued)

FOREIGN PATENT DOCUMENTS

JP   H03114371 A   5/1991

OTHER PUBLICATIONS

International Search Report issued in Intl. Appln. No. PCT/JP2016/002988 dated Sep. 27, 2016.
(Continued)

*Primary Examiner* — Twyler L Haskins
*Assistant Examiner* — Dwight Alex C Tejano
(74) *Attorney, Agent, or Firm* — Rossi, Kimms & McDowell LLP

(57) ABSTRACT

An image capturing apparatus sends to the lens apparatus command registration information indicative of a combination and a transmission order of a plurality of lens data to be transmitted from the lens apparatus to the image capturing apparatus, and requests the lens apparatus to continuously transmit the plurality of lens data in the transmission order based on the command registration information. The lens apparatus registers the command registration information in response to the command registration information received from the image capturing apparatus, and continuously transmits the plurality of lens data to the image capturing apparatus in the transmission order based on the command registration information in response to a transmission (Continued)

request command corresponding to the command registration information received from the image capturing apparatus.

18 Claims, 11 Drawing Sheets

(51) Int. Cl.
  *G03B 17/14* (2006.01)
  *G03B 7/20* (2006.01)
(52) U.S. Cl.
  CPC ..... *H04N 5/23216* (2013.01); *H04N 5/23245* (2013.01); *H04N 5/23258* (2013.01); *H04N 5/23287* (2013.01); *G03B 2206/00* (2013.01)

(56) References Cited

U.S. PATENT DOCUMENTS

| | | | |
|---|---|---|---|
| 5,761,560 A | 6/1998 | Miyazawa et al. | |
| 6,128,443 A | 10/2000 | Higuma | |
| 2004/0202464 A1* | 10/2004 | Miyasaka | G03B 7/26 396/529 |
| 2008/0199173 A1 | 8/2008 | Inoue | |
| 2009/0180770 A1* | 7/2009 | Honjo | G03B 5/00 396/55 |
| 2009/0245777 A1* | 10/2009 | Shibuno | G03B 13/36 396/104 |
| 2010/0309342 A1 | 12/2010 | Nagata | |
| 2011/0170853 A1* | 7/2011 | Osawa | G03B 7/20 396/529 |
| 2012/0140110 A1* | 6/2012 | Makigaki | G03B 17/14 348/345 |
| 2012/0219281 A1* | 8/2012 | Imafuji | G02B 7/08 396/529 |
| 2014/0293122 A1* | 10/2014 | Imamura | H04N 5/23209 348/360 |
| 2015/0281534 A1* | 10/2015 | Nakata | H04N 5/23209 348/373 |
| 2015/0346455 A1* | 12/2015 | Hasegawa | G02B 9/00 348/360 |

OTHER PUBLICATIONS

Written Opinion issued in Intl. Appln. No. PCT/JP2016/002988 dated Sep. 27, 2016.
International Preliminary Report on Patentability issued in Intl. Appln. No. PCT/JP2016/002988 dated Jan. 11, 2018.

* cited by examiner

IMAGE CAPTURING APPARATUS, LENS APPARATUS, AND DATA COMMUNICATION PROCESS PROGRAM

TECHNICAL FIELD

The present invention relates to an image capturing apparatus and a lens apparatus that communicate with each other.

BACKGROUND ART

In one lens interchangeable type camera system, an image capturing apparatus (referred to as a "camera body" hereinafter) provides an image capturing process, lens controls, and image recording, and a lens apparatus (referred to as an "interchangeable lens" hereinafter) drives a lens and an aperture stop in accordance with a control command from the camera body. In this camera system, the control command is communicated from the camera body to the interchangeable lens and lens information is communicated from the interchangeable lens to the camera body via a communication system for mutual communications of information.

A digital camera system among the interchangeable type camera systems is demanded for a smooth lens control in synchronization with an image capturing period in motion image capturing and in live-view display. For this purpose, it is necessary to synchronize image capturing timing of the camera body with control timing of the interchangeable lens, and the camera body needs to complete receiving the lens information necessary for the lens control and transmitting the control command to the interchangeable lens within the image capturing period.

A data amount of the lens information to be received by the camera body from the interchangeable lens increases due to sophisticated image capturing controls and a larger data amount needs to be communicated within a shorter time period due to a shortened image capturing period (or a higher frame rate).

Patent Literature ("PLT") 1 discloses a data communication system that includes an initial communication mode with the fixed number of communication words used to recognize a connection state between the camera body and the interchangeable lens and a controlled function in the interchangeable lens and a control communication mode with the variable number of communication words used to control a function of the interchangeable lens. In this communication system, the camera body determines the number of communication words in the control communication mode in accordance with the controlled function in the interchangeable lens obtained in the initial communication mode, and transmits information of the number of communication words to the interchangeable lens after the communication mode is switched. Thus, a communication data amount is reduced between the camera body and the interchangeable lens by limiting the communication data to the controlled function in the interchangeable lens and by eliminating unnecessary communication data.

CITATION LIST

Patent Literature

[PLT1] Japanese Patent Laid-Open No. 03-114371

SUMMARY OF INVENTION

Technical Problem

However, the communication system disclosed in PLT1, the camera body determines the number of communication words in the control communication mode in accordance with the controlled function in the interchangeable lens obtained in the initial communication mode, and informs the interchangeable lens of the information of the changed number of communication words in advance. Thereafter, this communication system requires to communicate using the changed number of communication words. In other words, this communication system needs the steps of determining the number of communication words and of transmitting the information to the interchangeable lens when the number of communication words is changed, and thus it takes a long time to start the communication with the changed communication words. When an acquisition request of the lens information is sent from the camera body to the interchangeable lens at a certain image capturing timing, the interchangeable lens replies to this transmission at the next image capturing period timing and thus the camera body is delayed in acquiring the lens information. Such a time period necessary to acquire the lens information results in a control lag in the camera system in which the camera body acquires the lens information and provides control based on the acquired lens information.

Moreover, according to the communication system disclosed in PLT1, the number of communication words for the control communication mode is determined in accordance with the controlled function of the interchangeable lens obtained in the initial communication mode, and thus a combination of communication data (data stream) is uniquely determined although its format is variable. Then, where at least one of the camera body and interchangeable lens is a new type and a counterpart is requested for a communication with a new data stream, the counterpart is unlikely to handle this request. In other words, when the future camera system adopts the new communication data stream, the communication system disclosed in PLT1 is inapplicable.

The present invention provides an image capturing apparatus and a lens apparatus that can transmit a large data amount from an interchangeable lens to a camera body without delay and easily communicate with each other using a new data stream.

Solution to Problem

An image capturing apparatus according to the present invention is configured to communicate with a lens apparatus that can be attached to and detached from the image capturing apparatus. The image capturing apparatus includes a command registration requester configured to send to the lens apparatus command registration information indicative of a combination and a transmission order of a plurality of lens data to be transmitted from the lens apparatus to the image capturing apparatus, and a transmission requester configured to request the lens apparatus to continuously transmit the plurality of lens data in the transmission order based on the command registration information.

Further features and aspects of the present invention will become apparent from the following description of exemplary examples with reference to the attached drawings.

Advantageous Effects of Invention

The present invention provides an image capturing apparatus and a lens apparatus that can transmit a large amount of data from an interchangeable lens to a camera body without delay and easily communicate with each other using a new data stream.

DESCRIPTION OF EMBODIMENTS

Exemplary embodiments of the invention will be described below with reference to the accompanied drawings.

Example 1

Figure 1:
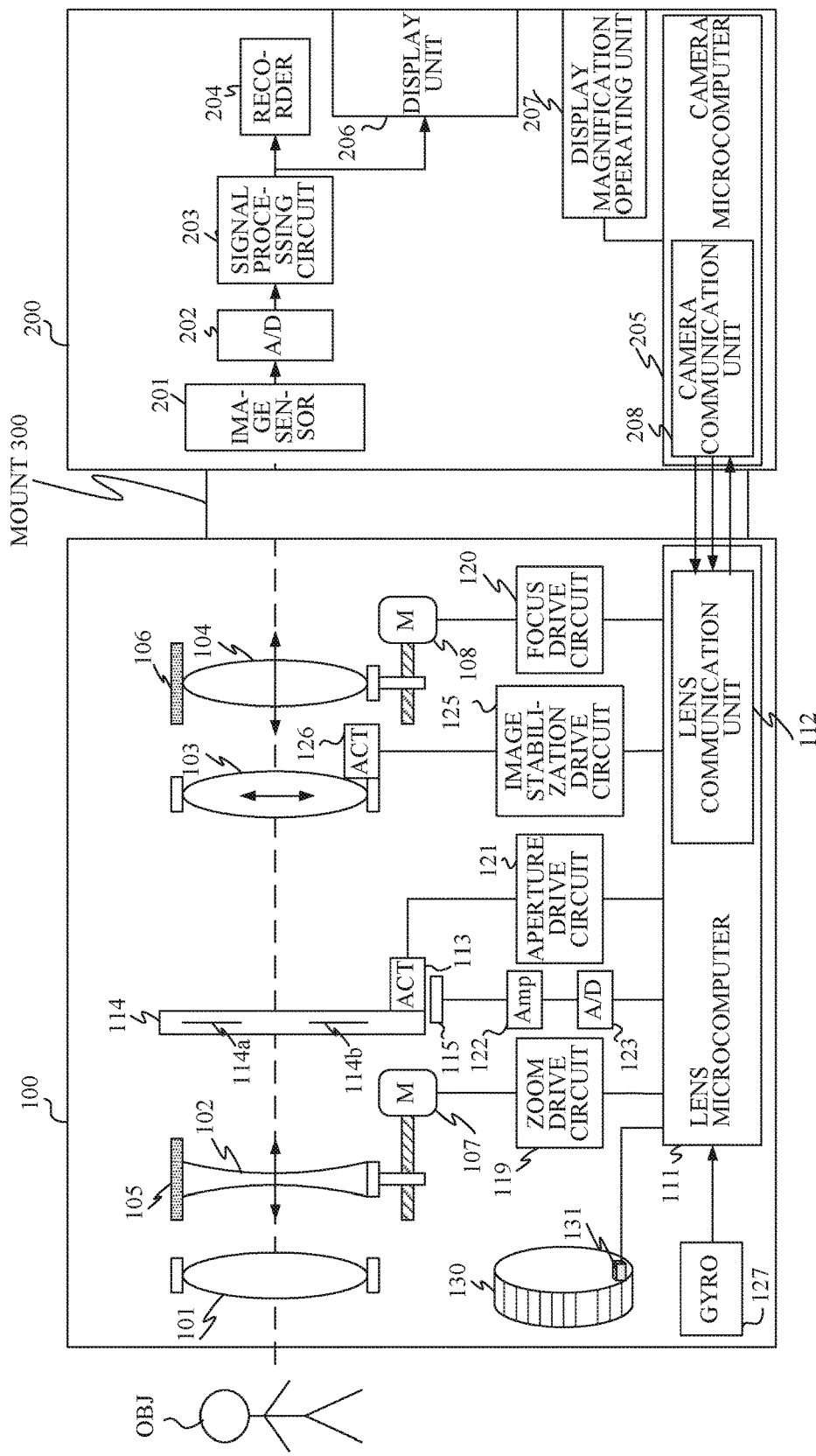
FIG. 1 is a block diagram of a configuration of a camera body and an interchangeable lens according to a first embodiment.

FIG. 1 illustrates a configuration of an image capturing system (referred to as a "camera system" hereinafter) that includes an image capturing apparatus (referred to as a "camera body" hereinafter) 200 and a lens apparatus (referred to as an "interchangeable lens" hereinafter) 100 according to a first embodiment of the present invention. The interchangeable lens 100 can be attached to and detached from the camera body 200. The camera body 200 and the interchangeable lens 100 are electrically connected so that they can communicate with each other. This camera system uses a so-called registration type command (custom command) and transmits a large amount of data.

The camera body 200 sends through communications to the interchangeable lens 100 a lens control command that instructs the interchangeable lens 100 to perform a variety of controls and a transmission request command that requests for data relating to internal information of the interchangeable lens 100 (referred to as "lens data" hereinafter). The lens data is data indicative of position information of each lens in the interchangeable lens 100, information indicative of a drive state of each actuator in the interchangeable lens 100, and optical information of the interchangeable lens 100. The interchangeable lens 100 sends through communications to the camera body 200 information indicative of a state of control (referred to as a "lens control" hereinafter) in the interchangeable lens 100 performed in response to the lens control command and lens data corresponding to the transmission request command.

The transmission request command from the camera body 200 contains an individual transmission request command that independently designates each of plural types of lens data and requests its individual transmission, and a continuous transmission request command that designates a combination of some lens data and requests a continuous transmission of them. The camera body 200 selectively sends one of the commands to the interchangeable lens 100 in accordance with a control status in the camera body 200.

The continuous transmission request command is a command used to request the interchangeable lens 100 for the continuous transmission that designates an arbitrary combination of lens data and an arbitrary transmission order. The camera body 200 can receive the best combination of lens data with the best transmission order in accordance with the image capturing mode and the control form in the camera body 200. The camera body 200 can select a different combination of lens data and a different transmission order of them for each interchangeable lens in accordance with a function of the interchangeable lens 100.

A description will now be given of a concrete configuration of the interchangeable lens 100 and the camera body 200. The interchangeable lens 100 and the camera body 200 are mechanically and electrically connected with each other via a mount 300 as a coupling mechanism. The interchangeable lens 100 acquires a power source from the camera body 200 via a power terminal unit (not illustrated) provided in the mount 300 and supplies power necessary for operations to a variety of actuators and lens microcomputer 111, which will be described later. The interchangeable lens 100 and the camera body 200 communicate with each other via a communication terminal unit (illustrated in FIG. 2) provided in the mount 300.

The interchangeable lens 100 includes an image capturing optical system. The image capturing optical system includes, in order from an object OBJ side, a field lens 101, a zoom lens (magnification lens) 102 for a magnification variation, an aperture stop unit 114 configured to adjust a light quantity, an image stabilization lens 103, and a focus lens 104 for focusing.

The zoom lens 102 is held by a lens holder 105, and the focus lens 104 is held by a lens holder 106. The lens holders 105 and 106 are movably guided by an unillustrated guide shaft in the optical axis direction (illustrated by a broken line), and driven in the optical axis direction by stepping motors 107 and 108. The stepping motor 107 and 108 move the zoom lens 102 and the focus lens 104 in synchronization with a drive pulse.

The image stabilization lens 103 shifts in a direction orthogonal to the optical axis of the image capturing optical system, and reduces an image blur cause by a camera vibration (or manual shakes).

The lens microcomputer 111 is a lens controller configured to control each component in the interchangeable lens 100. The lens microcomputer 111 receives a control command and a transmission request command sent from the camera body 200 via a lens communication unit 112 provided in the lens microcomputer 111. The lens microcomputer 111 performs provides a lens control corresponding to the control command and sends the lens data corresponding to the transmission request command via the lens communication unit 112 to the camera body 200.

The lens microcomputer 111 outputs a drive signal to a zoom drive circuit 119 and a focus drive circuit 120 in response to a command relating to a magnification variation and focusing in the control command so as to drive stepping motors 107 and 108. This configuration provides zooming for controlling the magnification variation with the zoom lens 102 and autofocus ("AF") for controlling focusing with the focus lens 104.

An aperture stop unit 114 includes aperture stop blades 114a and 114b. The states of the aperture stop blades 114a and 114b are detected by a Hall element 115, and information of the states is input into the lens microcomputer 111 via an amplifier circuit 122 and an A/D converter 123. The lens microcomputer 111 outputs a drive signal to the aperture drive circuit 121 and drives the aperture stop actuator 113 based on the input signal from the A/D converter 123. Thereby, the light quantity adjusting operation by the aperture stop unit 114 is controlled.

Moreover, the lens microcomputer 111 drives an image stabilization actuator 126, such as a voice coil motor, via an image stabilization drive circuit 125, in accordance with a camera shake detected by a shake detector 127, such as a vibration gyro sensor, provided in the interchangeable lens 100. Thereby, image stabilizing process controls a shift (image stabilization operation) of the image stabilization lens 103.

The camera body 200 includes an image sensor 201, such as a CCD sensor and a CMOS sensor, an A/D converter 202, a signal processing circuit 203, a recorder 204, a camera microcomputer 205, and a display unit 206.

The image sensor 201 photoelectrically converts an object image formed by the image capturing optical system in the interchangeable lens 100, and outputs an electric signal (analogue signal). The A/D converter 202 converts the analogue signal from the image sensor 201 into a digital signal. The signal processing circuit 203 generates a video signal by performing a variety of image processes for the digital signal from the A/D converter 202. The signal processing circuit 203 generates focus information representing a contrast state (focus state of the image capturing optical system) of the object image and luminous information representing the exposure state based on the video signal. The signal processing circuit 203 outputs a video signal to the display unit 206, and the display unit 206 displays a live-view image used to confirm a composition and a focus state in the video signal.

The camera microcomputer 205 as a camera controller controls the camera body 200 in accordance with an input from a camera operating member, such as an unillustrated image capturing designating switch and a variety of unillustrated setting switches. In accordance with an operation of the unillustrated zoom switch, the camera microcomputer 205 sends a control command relating to the magnification variation of the zoom lens 102, to the lens microcomputer 111 via a camera communication unit 208 provided in the camera microcomputer 205. Moreover, the camera microcomputer 205 sends a control command relating to focusing of the focus lens 104 based on the focus information and a light quantity adjusting operation of the aperture stop unit 114 based on the luminous information, to the lens microcomputer 111, via the camera communication unit 208.

Next follows a description of a communication circuit between the camera body 200 (camera microcomputer 205) and the interchangeable lens 100 (lens microcomputer 111) and communication processes between them. The camera microcomputer 205 serves as a command registration requester and a transmission requester. The lens microcomputer 111 serves as a lens data generator, a registration unit, and a data transmitter.

Figure 2:
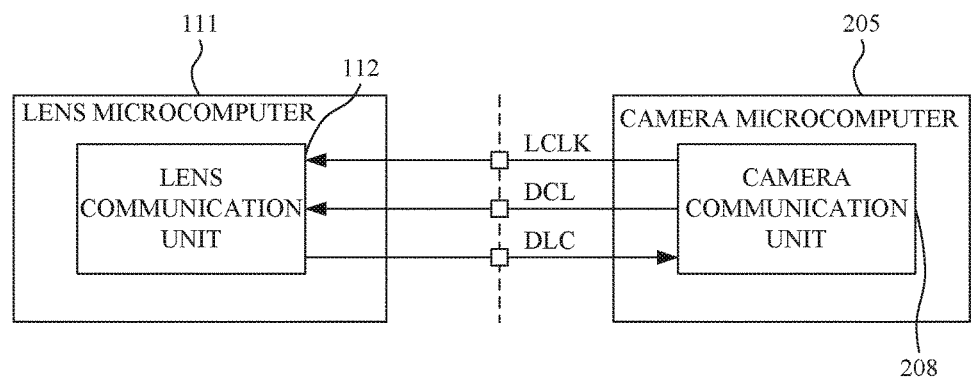
FIG. 2 is a view of a communication circuit between the camera body (camera microcomputer) and an interchangeable lens (lens microcomputer) according to the first embodiment.

FIG. 2 illustrates the communication circuit formed between the camera microcomputer 205 and the lens microcomputer 111. The camera microcomputer 205 and the lens microcomputer 111 communicate with each other via the communication terminal unit provided in the mount 300. This embodiment uses a three-line type clock synchronous serial communication method. The three lines, as used herein, contain a communication line for a clock signal LCLK, a communication line for a data signal DCL, and a communication line for a data signal DLC. The clock signal LCLK is sent to the lens microcomputer 111 as a slave from the camera microcomputer 205 as a master. The communication signal DCL contains a control command and a transmission request command etc. from the camera microcomputer 205 to the lens microcomputer 111. The data signal DLC contains lens data etc. to be transmitted from the lens microcomputer 111 to the camera microcomputer 205 in synchronization with the clock signal. The camera microcomputer 205 and the lens microcomputer 111 communicate with each other in a full duplex method that provides mutual and simultaneous transmissions and receptions in synchronization with a common clock signal.

FIGS. 3A to 5 illustrate waveforms of communication signals communicated between the camera microcomputer 205 and the lens microcomputer 111. The arrangement of the communication procedure will be referred to as a communication protocol. The camera microcomputer 205 and lens microcomputer 111 communicate with each other using two types of communication protocols, i.e., an individual communication protocol and a continuous communication protocol, which will be described later. The camera microcomputer 205 selects an appropriate one of these two communication protocols in accordance with the image capturing mode and the control status of the camera body 200, etc.

Figure 3A:
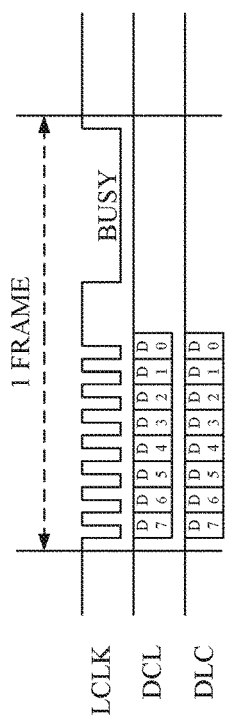
FIGS. 3A and 3B illustrate a first communication protocol according to the first embodiment.
Figure 3B:
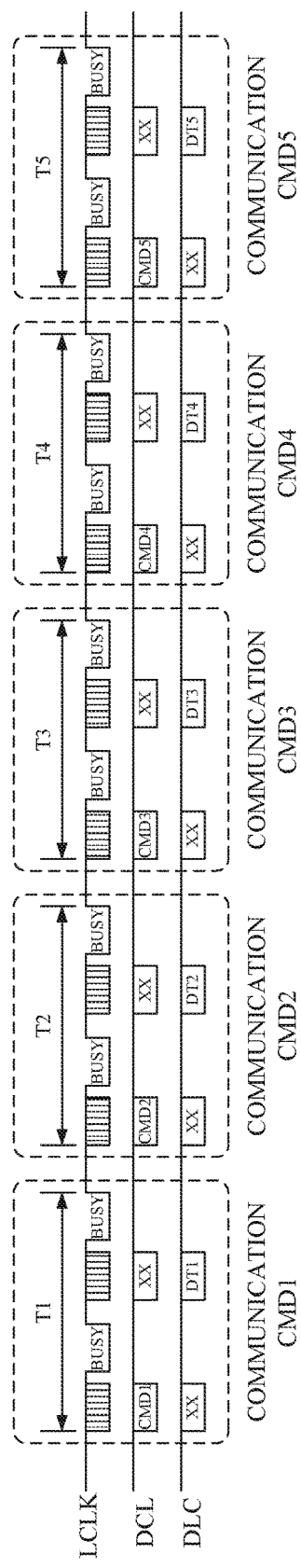

The specification of each communication protocol will be described as follows. FIGS. 3A and 3B illustrate signal waveforms in the individual communication protocol as a first communication protocol. The individual communication protocol is selected, for example, when the image capturing mode set in the camera body 200 is a still image capturing mode.

FIG. 3A illustrates a waveform of one frame as a minimum communication unit. Initially, the camera microcomputer 205 outputs the clock signal LCLK in which one set contains pulses for eight periods, and the camera microcomputer 205 transmits the data signal DCL to the lens microcomputer 111 in synchronization with the clock signal LCLK. At the same time, the camera microcomputer 205 receives the data signal DLC output from the lens microcomputer 111 in synchronization with the clock signal LCLK. In this way, one-byte (8-bit) data is transmitted and received between the lens microcomputer 111 and the camera microcomputer 205 in synchronization with one set of clock signal LCLK. After this data is transmitted and received, a communication suspension period is inserted by a communication standby request command (simply referred to as a "communication standby request" hereinafter) BUSY, which will be described in detail later. One frame is a communication unit for a set of eight periods of the clock signal LCLK and the subsequent communication standby request BUSY period.

FIG. 3B illustrates a flow of data communications that include five communication sequences "communication CMDn" (n=1 to 5) each of which contains communications for two frames. The two-frame communication contained in the "communication CMDn" is performed, for example, when the camera microcomputer 205 acquires lens data DTn from the lens microcomputer 111.

In the "communication CMDn," the camera microcomputer 205 sends the clock signal LCLK to the lens microcomputer 111 and sends as the data signal DCL the individual transmission request command CMD1 corresponding to the lens data DT1 to be transmitted. The data signal DLC in this frame is treated as invalid data.

Next, the camera microcomputer 205 switches the communication terminal state in the camera body 200 from the output format to the input format after outputting the clock signal LCLK for eight periods. The lens microcomputer 111 turns the clock signal LCLK into the output format after switching of the communication terminal state of the camera body 200 is completed, and sets a signal level to a low level so as to inform the camera microcomputer 205 of the communication standby request BUSY. The camera microcomputer 205 maintains the input format of the communication terminal while the communication standby request BUSY is being informed, and suspends the communication to the lens microcomputer 111.

The lens microcomputer 111 generates the lens data DT1 corresponding to the individual transmission request command CMD1 in the notification period of the communication standby request BUSY, and switches the clock signal LCLK to a high level after the lens microcomputer 111 completes a transmission preparation of the data signal DLC for the next frame. Then, the lens microcomputer 111 releases the communication standby request BUSY. When the camera microcomputer 205 recognizes the release of the communication standby request BUSY, the camera microcomputer 205 sends the clock signal LCLK for one frame to the lens microcomputer 111 and receives the lens data DT1 from the lens microcomputer 111. In the subsequent communication sequence from the "communication CMD2" to the "communication CMD5," the camera microcomputer 205 acquires the lens data DT2 to DT5 individually since the camera microcomputer 205 and the lens microcomputer 111 communicate with each other similar to the "communication CMD1."

FIGS. 4A to 4D illustrate signal waveforms in the continuous communication protocol as a second communication protocol. The continuous communication protocol is selected, for example, when the image capturing mode set in the camera body 200 is the motion image capturing mode.

Figure 4A:
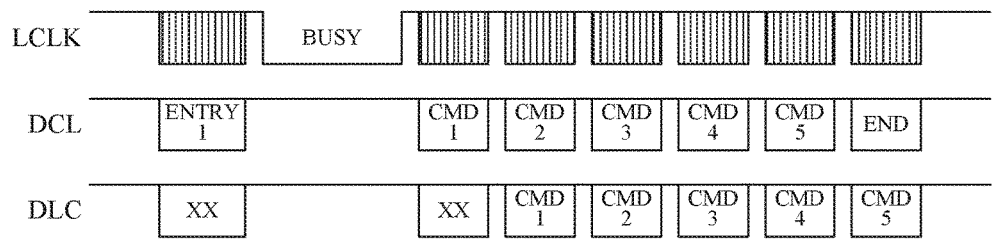
FIGS. 4A to 4D are waveform charts when a second communication protocol is registered according to the first embodiment.
Figure 4B:
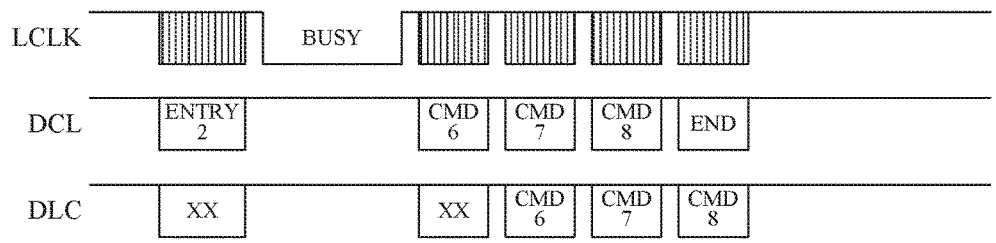

FIGS. 4A and 4B illustrate a first registration method of a custom command to the lens microcomputer 111 in the continuous communication protocol. The custom command as the command registration information is made by a combination of the individual transmission request commands CMDn (n=1, 2, . . . ) in the individual communication protocol. In the continuous communication protocol, the CMDn is referred to as a command component.

Referring now to FIG. 4A, a description will be given of a first registration method of a custom command. FIG. 4A illustrates a signal waveform when the custom command 1 is registered which is used for the camera microcomputer 205 to obtain five lens data DT1, DT2, DT3, DT4, and DT5 illustrated in FIG. 5 in this order from the lens microcomputer 111 in the continuous communication protocol.

The camera microcomputer 205 has obtained plural types of lens data of the interchangeable lens 100 attached to the camera body 200 through communications. A registration table CTBL1 (referred to as a "camera registration table" hereinafter) of the custom command is generated based on the lens data. A description will be given later of generation procedure of the camera registration table CTBL1.

Initially, the camera microcomputer 205 refers to the camera registration table CTBL1, and sends the registration request command ENTRY1 to be registered as the custom command 1 to the lens microcomputer 111. When the lens microcomputer 111 receives the registration request command ENTRY1, the lens microcomputer 111 fixes the clock signal LCLK to a low level, and the informs the camera microcomputer 205 of the communication standby request BUSY, starting a registration preparation of the custom command 1. Next, the lens microcomputer 111 completes the registration preparation, and releases the communication standby request BUSY.

The camera microcomputer 205 recognizes the release of the communication standby request BUSY, and transmits the custom command 1 to the lens microcomputer 111. More specifically, the camera microcomputer 205 sends the custom command 1 (combination of the command components CMDn) representing a combination of two or more types of lens data DTn (n=1, 2, . . . ) and a transmission order to be transmitted from the lens microcomputer 111, in the same order as the transmission order.

In FIG. 4A, the camera microcomputer 205 requests the lens microcomputer to transmit the lens data DT1, DT2, DT3, DT4, and DT5 in this order. Therefore, the camera microcomputer 205 sends command components CMD1, CMD2, CMD3, CMD4, and CMD5 that constitute the custom data 1, in this order to the lens microcomputer 111. In requesting a transmission of the lens data DT3, DT2, DT1, DT5, and DT4 in this order, the camera microcomputer 205 sends the command components CMD3, CMD2, CMD1, CMD5, and CMD4 that constitute the custom data, in this order to the lens microcomputer 111. The camera microcomputer 205 that has transmitted the custom data 1 (CMD1 to CMD5) to the lens microcomputer 111 then sends the registration completion command END used to inform the lens microcomputer 111 of the registration completion.

On the other hand, the lens microcomputer 111 transmits, as the next one-byte communication to the camera microcomputer 205, the same values CMDn as the command components CMDn of the custom data 1 transmitted as the data signal DCL from the camera microcomputer 205. Thereby, the camera microcomputer 205 can recognize that the command components CMDn have been correctly transmitted to and registered in the lens microcomputer 111.

FIG. 4A illustrates that the lens microcomputer 111 transmits the communication standby request BUSY to the camera microcomputer 205 after receiving the transmission request command CMD1, and does not transmit the communication standby request BUSY after receiving the transmission request commands on and after CDM2. In other words, the data communication format illustrated in FIG. 4A contains a command frame with the communication standby request BUSY informed from the lens microcomputer 111 to the camera microcomputer 205 and a data frame without the communication standby request. Of course, this is merely illustrative, and the communication standby request BUSY may be added after the transmission request commands on and after CMD2 are received in accordance with the processing status in the lens microcomputer 111.

Figure 6:
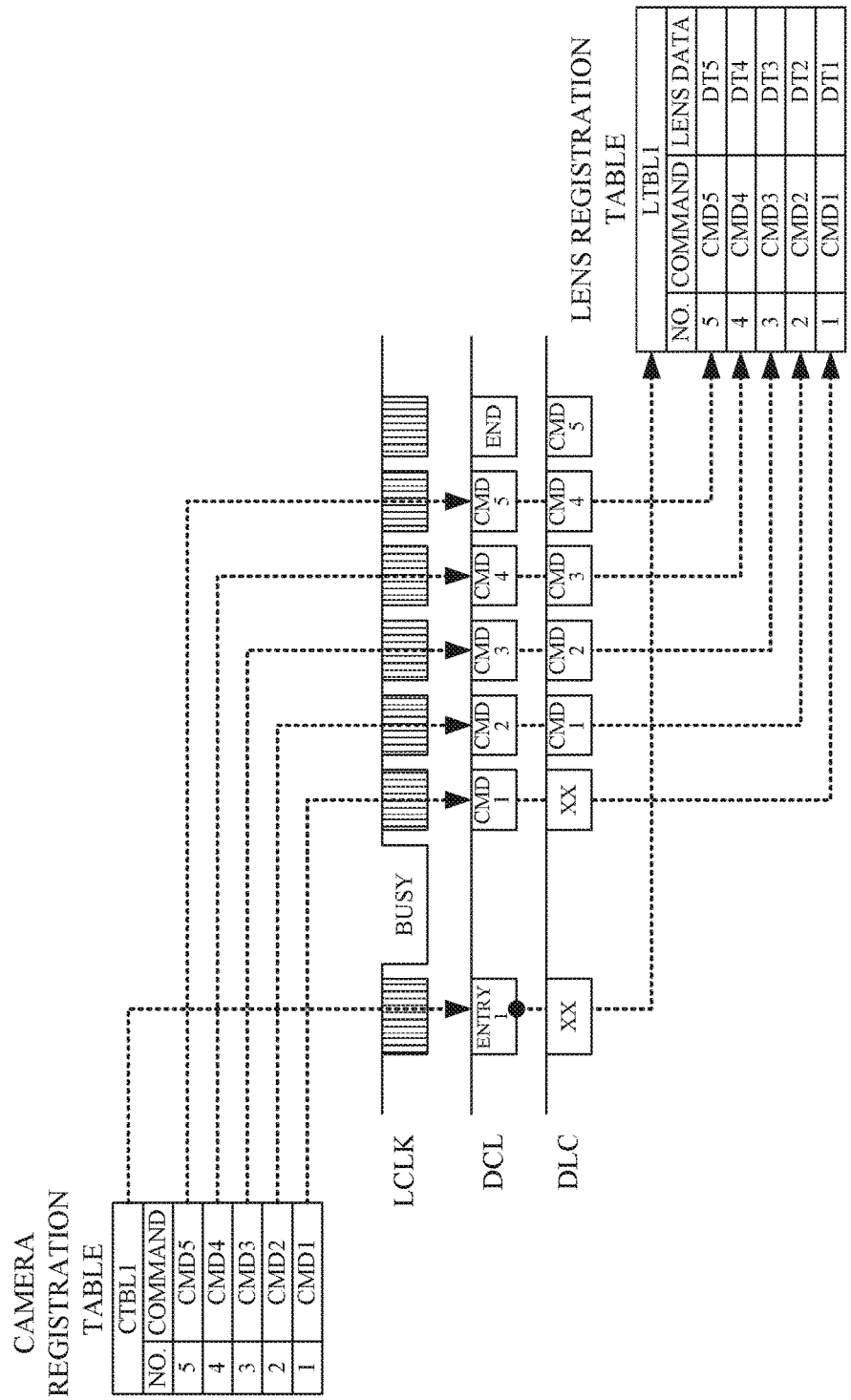
FIG. 6 illustrates a procedure of registering custom command registration information from the camera microcomputer to the lens microcomputer according to the first embodiment.

Referring now to FIG. 6, a description will be given of registration process performed by the lens microcomputer 111 so as to register the custom command 1. The camera microcomputer 205 stores the registration table CTBL1 (referred to as a "camera registration table" hereinafter).

The lens microcomputer 111 selects data table LTBL1 (referred to as a "lens registration table" hereinafter) for the custom command 1 held in the lens microcomputer 111 when receiving the registration request command ENTRY1. Next, the lens microcomputer 111 stores the command component CMD1 which the lens microcomputer 205 firstly receives from the camera microcomputer 205 and lens data DT1 corresponding to the CMD1 at an address of the arrangement number 1. Next, the lens microcomputer 111 stores the command component CMD2 which the lens microcomputer 205 secondly receives from the camera microcomputer 205 and the lens data DT2 corresponding to the CMD2 at an address of the arrangement number 2 in the lens registration table LTBL1. The same process is applied to the arrangement numbers 3 to 5. The lens microcomputer 111 completes the registrations into the lens registration table LTBL1 when the lens microcomputer 111 receives a registration completion command END from the camera microcomputer 205.

FIG. 4B illustrates a method for registering a custom command 2 different from the custom command 1 in the lens microcomputer 111 similar to the registration of the custom command 1 illustrated in FIG. 4A. In FIG. 4B, the camera microcomputer 205 requests the lens microcomputer 111 to transmit the lens data DT6, DT7, and DT8 in this order. For this purpose, after the camera microcomputer 205 transmits a registration request command ENTRY2 to the lens microcomputer 111, the camera microcomputer 205 transmits the command components CMD6, CMD7, and CMD8 that constitute the custom command 2, in this order. In requesting a transmission of the lens data DT8, DT6, and DT7 in this order, the camera microcomputer 205 sends the command components CMD8, CMD6, and CMD7 for the custom command in this order to the lens microcomputer 111. The camera microcomputer 205 that has sent the custom data 2 (CMD6 to CMD8) to the lens microcomputer 111 then sends the registration completion command END to the lens microcomputer 111.

Even in FIG. 4B, the lens microcomputer 111 selects the lens registration table LTBL2 (unillustrated) for the custom command 2 when receiving the registration request command ENTRY2. The lens microcomputer 111 stores the command components CMD6 to CMD8 which the lens microcomputer 111 sequentially receives from the camera microcomputer 205 and the lens data DT56 to DT8 corresponding to the command component CMD6 to CMD8 at addresses of the arrangement numbers 1 to 3 in the lens registration table LTBL2. The lens microcomputer 111 completes the registration process of the lens registration table LTBL2 when receiving the registration completion command END from the camera microcomputer 205.

Figure 4C:
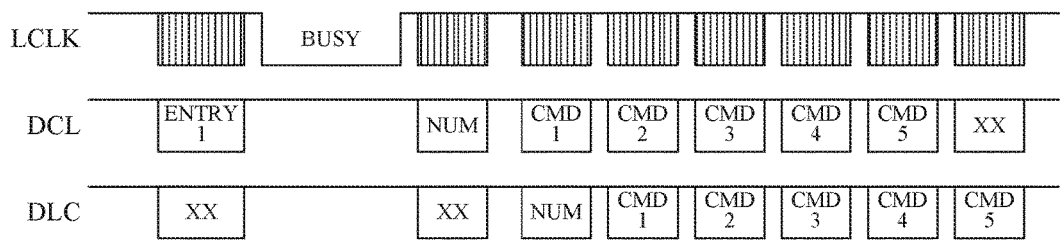
Figure 4D:
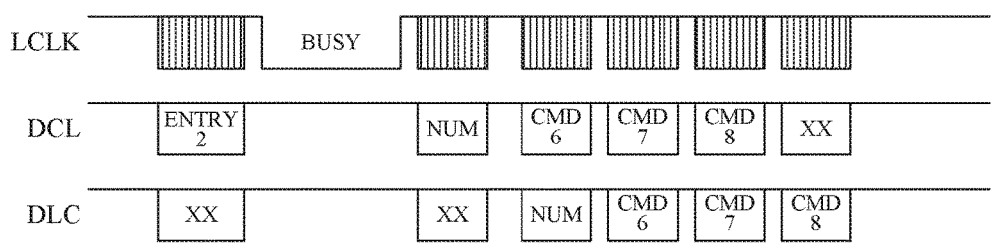

FIGS. 4C and 4D illustrate a second registration method of the custom command into the lens microcomputer 111 in the continuous communication protocol. The combination of the custom commands as the command registration information is the same as the registration data described in the first registration method of the custom command, and a description will now be given of a difference in the registration method.

Initially, in FIG. 4C, the camera microcomputer 205 refers to the camera registration table CTBL1, and transmits the registration request command ENTRY 1 to the lens microcomputer 111. The lens microcomputer 111 informs the camera microcomputer 205 of the communication standby request BUSY when receiving the registration request command ENTRY 1. Thereafter, until the communication standby request BUSY is released after the lens microcomputer 111 prepares for the registration of the custom command 1, the procedure is the same as the first registration method of the custom command.

Next, the camera microcomputer 205 recognizes the release of the communication standby request BUSY, and sends a "component number NUM" (which is 5 in FIG. 4C) indicative of the number of command components CMDn to be registered in the custom command 1. Next, the camera microcomputer 205 sends, in the same order as a transmission order, the custom command 1 that indicates the combination and the transmission order of two or more types of lens data DTn (n=1, 2, . . . ) to be transmitted from the lens microcomputer 111.

In FIG. 4C, the camera microcomputer 205 requests the lens microcomputer 111 to transmit the lens data DT1, DT2, DT3, DT4, and DT5 in this order. Therefore, the camera microcomputer 205 sends the command components CMD1, CMD2, CMD3, CMD4, and CMD5 that constitute the custom data 1, in this order to the lens microcomputer 111. Thereafter, the camera microcomputer 205 sends the clock signal LCLK for the last one frame to the lens microcomputer 111 so as to obtain the final data signal DLC (CMD 5) from the lens microcomputer 205. Thus, the second registration of the custom command is completed.

On the other hand, the lens microcomputer 111 recognizes the number of command components CMDn when receiving the component number NUM. Thereafter, similar to the first registration method of the custom command, the lens microcomputer 111 registers the command components in the lens registration table LTBL1. The lens microcomputer 111 performs this registration up to the final arrangement number designated by the component number NUM. Thus, the registration process into the lens registration table LTBL1 is completed.

The camera microcomputer 205 can select the custom commands or a combination of lens data in accordance with a process in the camera body 200 by previously registering the plurality of custom commands into the lens microcomputer 111. For example, the custom command 1 can be selected so as to obtain a combination of lens data necessary for the AF process, and the custom command 2 can be selected so as to obtain a combination of lens data necessary for the image stabilizing process.

Each lens data DTn stored in the lens registration table may be a fixed value or a variable. When it is a variable, address information is stored in the memory, such as a RAM, in the interchangeable lens 100 in which the variable is stored.

Figure 5:
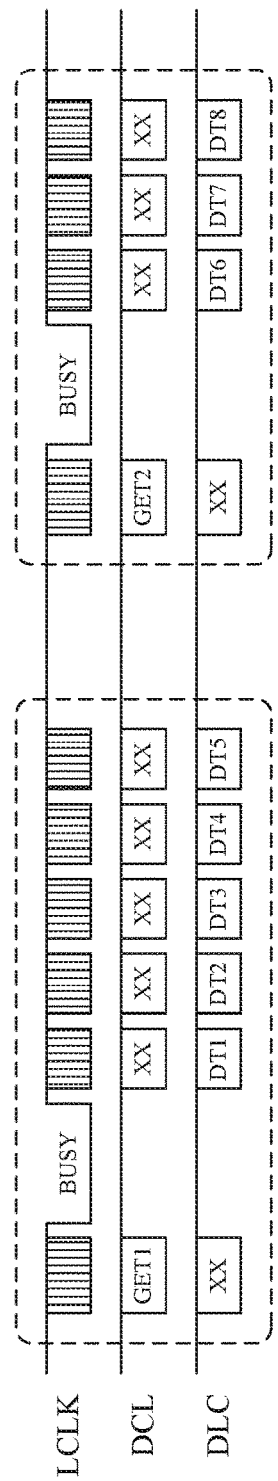
FIG. 5 is a waveform chart when the second communication protocol is acquired according to the first embodiment.

Next follows a description of a method of enabling the camera microcomputer 205 to obtain the lens data corresponding to the custom commands 1 and 2 from the lens microcomputer 111. FIG. 5 illustrates signal waveform at this time. Now assume that the custom commands 1 and 2 have been registered in the lens microcomputer 111.

Initially, in FIG. 5, the camera microcomputer 205 sends the transmission request command of the lens data to the lens microcomputer 111 so as to obtain the lens data DT1 to DT5 necessary for a first camera process, such as the AF process, from the lens microcomputer 111. At this time, the lens data DT1 to DT5 or the command components CMD1 to CMD5 correspond to the custom command 1. Therefore, the camera microcomputer 205 generates and sends a transmission request command GET1 corresponding to the custom command 1 to lens microcomputer 111.

The lens microcomputer 111 that has received the transmission request command GET1 informs the camera microcomputer 205 of the communication standby request BUSY by fixing the clock signal LCLK to the low level. Then, the lens microcomputer 111 generates the lens data DT1 to DT5 corresponding to the transmission request command GET1. When the lens microcomputer 111 generates the lens data DT1 to DT5 and ready to transmit them, the lens microcomputer 111 releases the communication standby request BUSY.

The camera microcomputer 205 that has recognized the release of the communication standby request BUSY sends the clock signal LCLK for five frames so as to obtain the 5-byte lens data DT1 to DT5 corresponding to the transmission request command GET1. The lens microcomputer 111 sends five lens data in order of DT1, DT2, DT3, DT4, and DT5 corresponding to the registered custom command 1 (CMD1, CMD2, CMD3, CMD4, and CMD5) as the data signal DLC to the camera microcomputer 205. The camera microcomputer 205 performs the first camera process using the received lens data DT1 to DT5.

When the first camera process is completed, the camera microcomputer 205 subsequently performs a second camera process, such as an image stabilizing process, and generates and sends the transmission request command GET2 corresponding to the custom command 2 to the lens microcomputer 111. The lens microcomputer 111 that has received the transmission request command GET2 informs the camera microcomputer 205 of the communication standby request BUSY and generates the lens data DT6 to DT8 corresponding to the transmission request command GET2. Thereafter, the camera microcomputer 205 sends the clock signal LCLK for three frames to the lens microcomputer 111 that has released the communication standby request BUSY so as to obtain the 3-byte lens data DT6 to DT8 corresponding to the transmission request command GET2. The lens microcomputer 111 sends the three lens data in order of DT6, DT7, and DT8 corresponding to the registered custom command 1 (CMD6, CMD7, and CMD8) to the camera microcomputer 205. The camera microcomputer 205 performs the second camera process using the received lens data DT6 to DT8.

Figure 7:
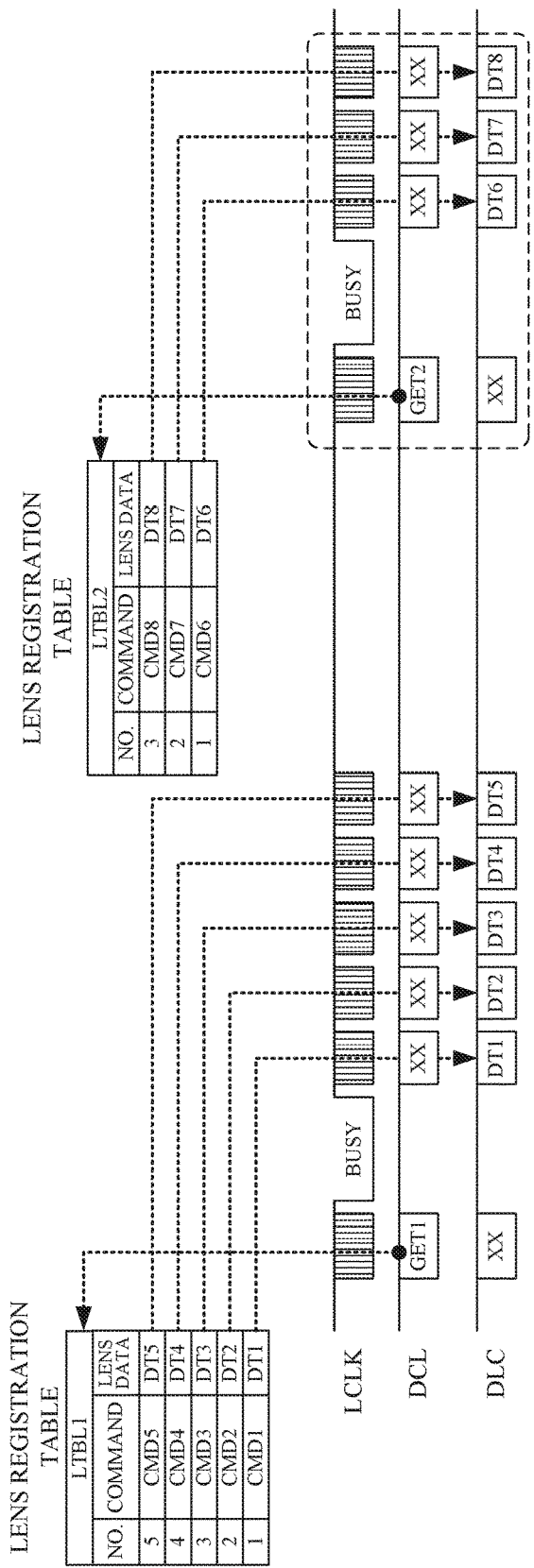
FIG. 7 illustrates a custom command process in the lens microcomputer according to the first embodiment.

FIG. 7 illustrates a generation process of the lens data DTn performed when the lens microcomputer 111 receives the transmission request commands GET1 and GET2 from the camera microcomputer 205.

As described above, the lens microcomputer 111 informs, when receiving the transmission request command GET1, the camera microcomputer 205 of the communication standby request BUSY by fixing the clock signal LCLK to the low level. In addition, the lens microcomputer 111 selects the lens registration table LTBL1 for the custom command 1 stored in the lens microcomputer 111.

Next, the lens microcomputer 111 recognizes that the first registered lens data is DT1 and generates the lens data DT1 by referring to the address of the arrangement number 1 in the lens registration table LTBL1. Then, the lens microcomputer 111 stores the generated lens data DT1 in the unillustrated transmission FIFO memory. Thereafter, the lens microcomputer 111 performs a similar process for the arrangement numbers 2 to 5 in the lens registration table LTBL1. When confirming that the lens data DT5 corresponding to the registered lens data at the address of the arrangement number 5, has been stored into the FIFO memory, the lens microcomputer 111 completes the lens data generation process corresponding to the transmission request command GET1.

When the lens microcomputer 111 is ready to transmit the lens data DT1 to DT5, the lens microcomputer 111 releases the communication standby request BUSY as described above. Thereby, the camera microcomputer 205 resumes the communication process with the lens microcomputer 111 and sends the clock signals for five frames to the lens microcomputer 111. The lens microcomputer 111 continuously sends the lens data DT1 to DT5 as the data signal DLC to the camera microcomputer 205 in synchronization with the clock signal LCLK.

This embodiment previously registers a plurality of custom commands in the lens microcomputer 111, and the camera microcomputer 205 selects the custom commands in accordance with the camera process in the camera body 200, and sends the corresponding transmission request command to the lens microcomputer 111. Thereby, the camera microcomputer 205 can obtain a large amount of lens data from the lens microcomputer 111 in a short period, and can consequently perform camera process at a high speed.

In this embodiment, the individual communication protocol is set in the still image capturing mode and the continuous communication protocol is selected in the motion image capturing mode. However, selecting these two communication protocols is not limited to this embodiment, and may depend upon controls and processes in the camera body 200. For example, the communication with the continuous communication protocol may not be suitable for the motion image capturing mode due to the operating state of the user and the image capturing state. In that case, the individual communication protocol may be selected. In addition, the continuous communication protocol may be selected in the still image capturing mode with a camera process using a predetermined combination of lens data.

Figure 8:
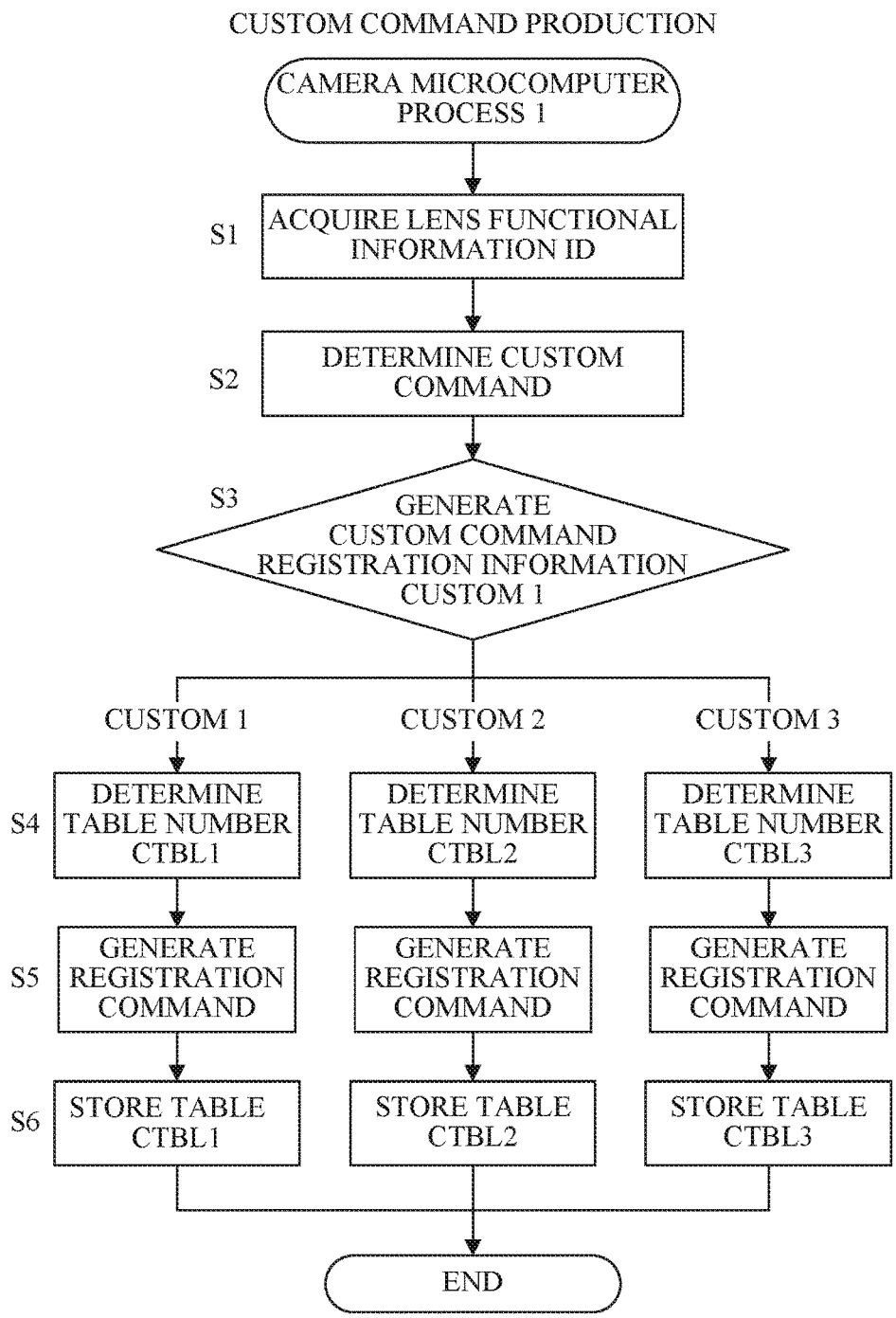
FIG. 8 is a flowchart of a generation process of the custom command registration information in the camera microcomputer according to the first embodiment.
Figure 9:
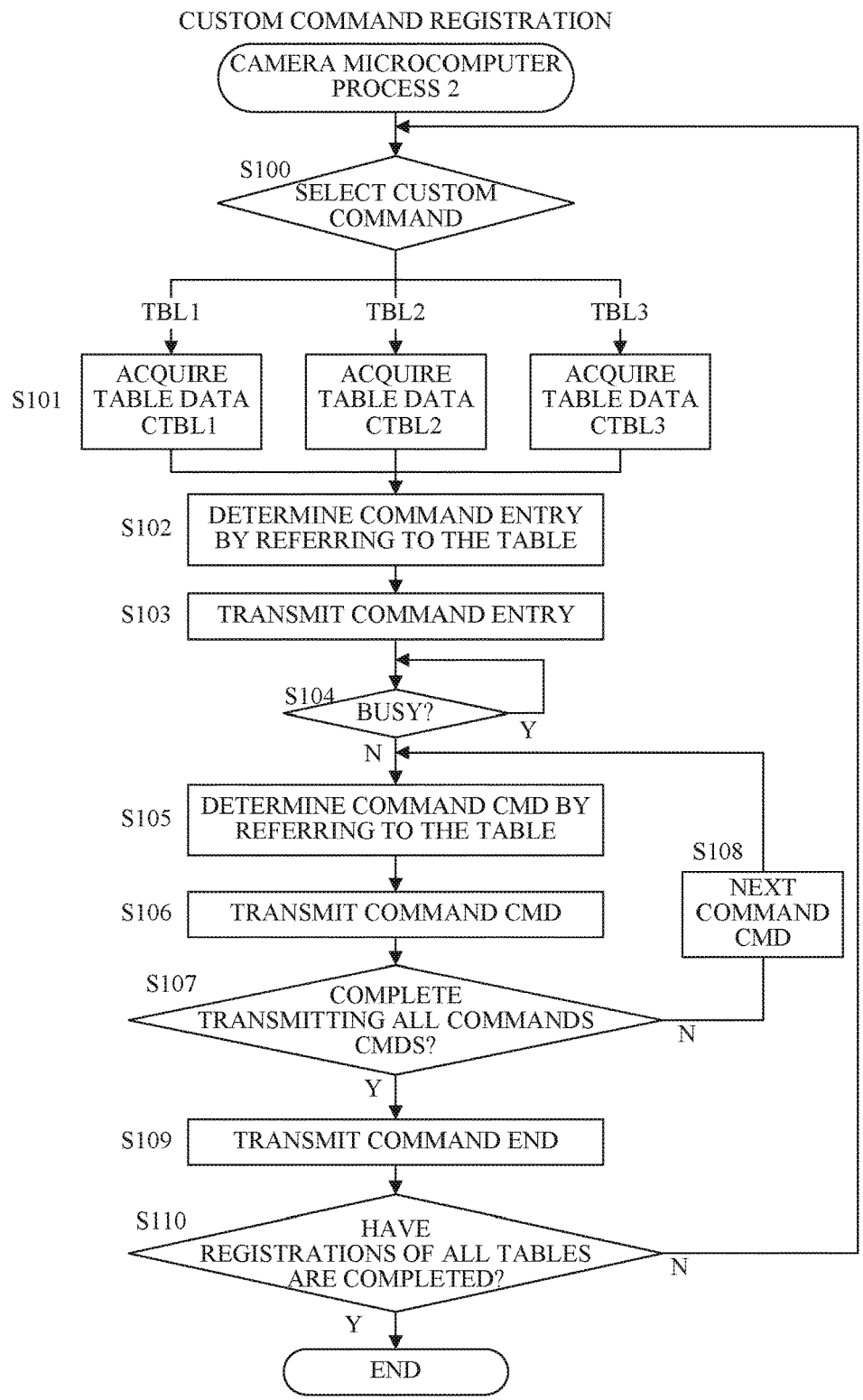
FIG. 9 is a flowchart of the custom command registration process in the camera microcomputer according to the first embodiment.
Figure 10:
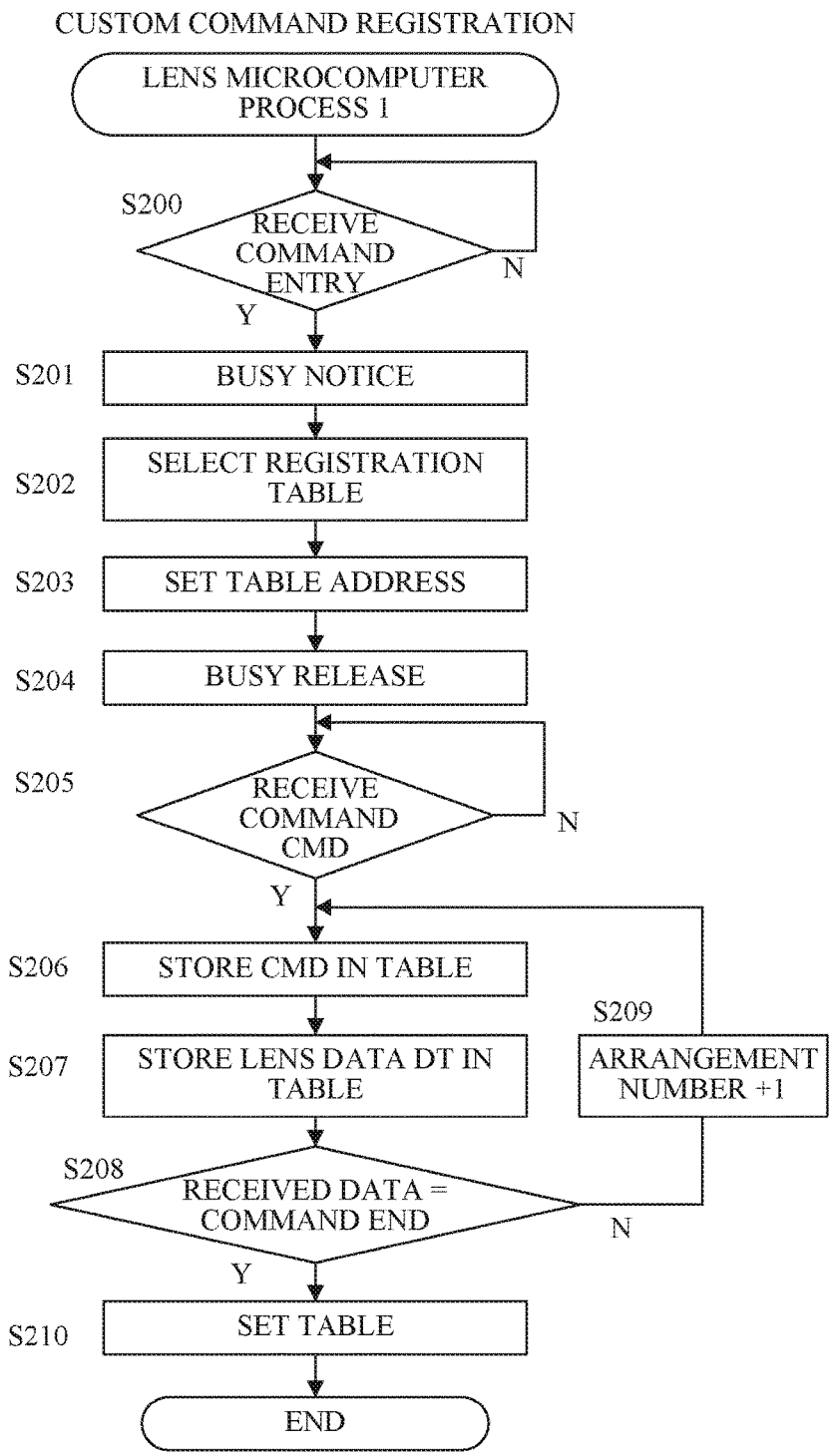
FIG. 10 is a flowchart of the custom command registration process in the lens microcomputer according to the first embodiment.
Figure 11:
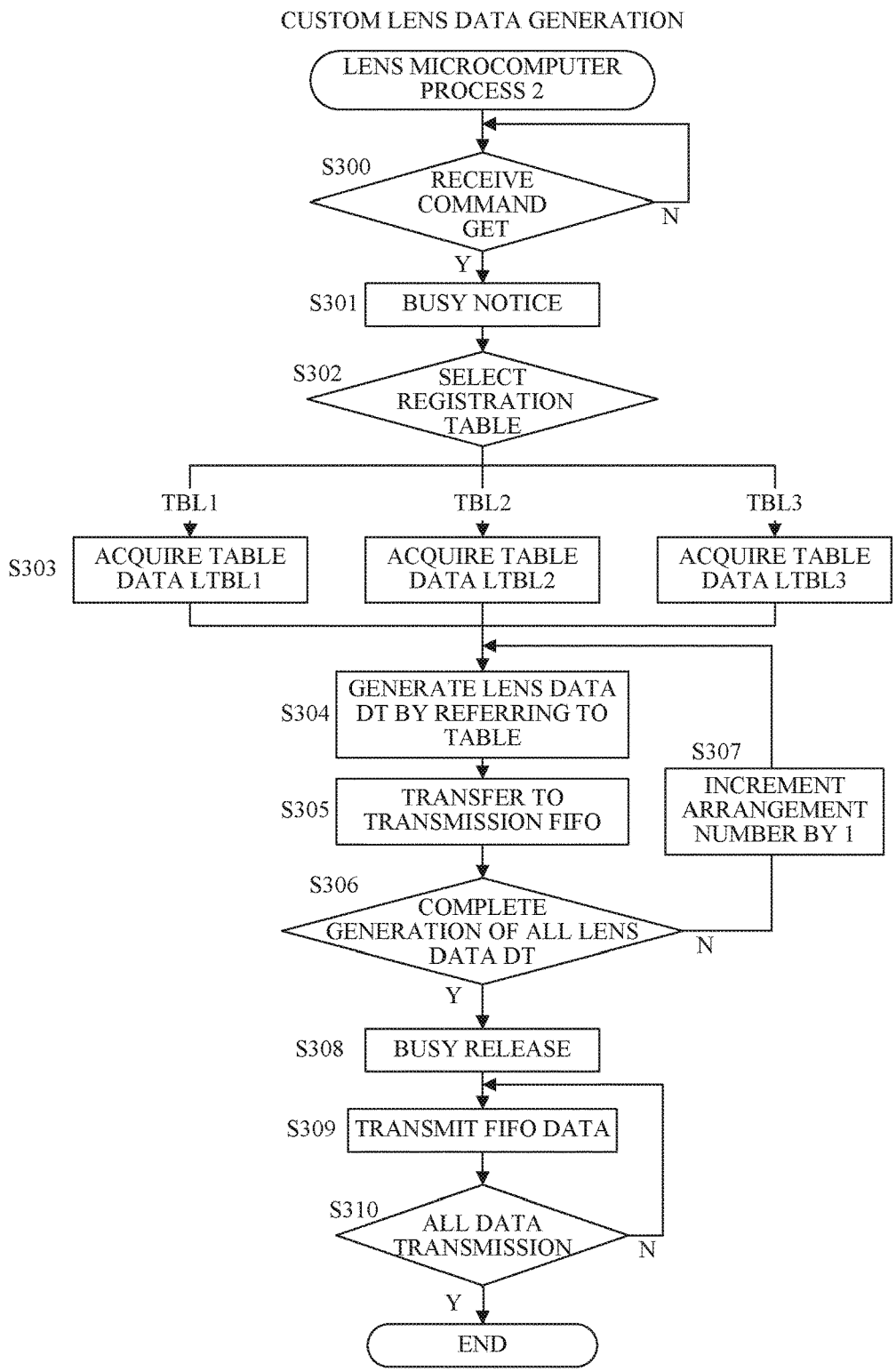
FIG. 11 is a flowchart when the custom command is received by the lens microcomputer according to the first embodiment.

Referring now to flowcharts in FIGS. 8 to 11, a description will be given of a concrete process performed by the camera microcomputer 205 and the lens microcomputer 111 when the camera microcomputer 205 selects the continuous communication protocol. The flowcharts in FIGS. 8 and 9 are processes performed by the camera microcomputer 205, and the flowcharts in FIGS. 10 and 11 are processes performed by the lens microcomputer 111. The camera microcomputer 205 and the lens microcomputer 111 perform these processes in accordance with the data communication process program as a computer programs.

FIG. 8 illustrates a process (camera microcomputer process 1) performed by the camera microcomputer 205 so as to generate the custom command. The camera microcomputer 205 obtains lens functional information (lens specific information) ID from the lens microcomputer 111 in step S1. The lens functional information ID may represent a function of the interchangeable lens 100, such as an AF function, an image stabilization function, and a zoom function, or the lens data stored in the interchangeable lens 100, such as the lens microcomputer 111. Moreover, the lens functional information ID may be information indicative of the individual transmission request command acceptable to the interchangeable lens 100. The lens functional information ID is information inherent to the interchangeable lens 100 which is different for each product of the interchangeable lens 100.

Since the lens functional information ID is generally invariable, the lens microcomputer 111 may send it only once to the camera microcomputer 205 when the interchangeable lens 100 is attached to the camera body 200. When the lens functional information ID is variable, new lens functional information ID is sent from the lens microcomputer 111 to the camera microcomputer 205 whenever it varies.

Next, in the step S2, the camera microcomputer 205 determines the custom command m (m=1, 2, . . . ) to be registered in the lens microcomputer 111, based on the lens functional information ID obtained in the step S1. In the step S3, the camera microcomputer 205 starts the generation process of the custom command m.

In the step S4 as the generation process of the custom command m, the camera microcomputer 205 initially determines a number m of the data table (camera registration table CTBLm) in which the custom command m is stored in the memory in the camera microcomputer 205.

Next, in the step S5, the camera microcomputer 205 determines a combination and an order of the command components contained in the custom command m (or two or more types of lens data which the lens microcomputer 111 is requested to transmit) and generates the custom command m. For example, the lens data necessary for the process of the camera microcomputer 205 in motion image capturing contains focus related information, image stabilization related information, aperture stop related information, and magnification variation related information. The order of receiving these pieces of information by the camera microcomputer 205 is set so that a transmission request of lens data of a more prioritized type to be obtained at an earlier time can be made earlier.

The camera microcomputer 205 stores the custom command m thus generated in the step S5, in the data table of the number m determined in the step S4. Thus, the camera microcomputer 205 completes the generating process of the custom command.

FIG. 9 illustrates a process (camera microcomputer process 2) performed by the camera microcomputer 205 for the lens microcomputer 111 so as to register the custom command. In the step S100, the camera microcomputer 205 determines the custom command m to be registered in the lens microcomputer 111. The memory in the camera microcomputer 205 previously stores two or more command components CMDn that constitute the plurality of custom command m and its order as table data (camera registration table CTBLm) for each custom command.

Next, in the step S101, the camera microcomputer 205 obtains the camera registration table CTBLm corresponding to the custom command m that is determined to be registered in the lens microcomputer 111.

Next, in the step S102, the camera microcomputer 205 determines the registration request command ENTRYm corresponding to the custom command m registered in the lens microcomputer 111.

Next, in the step S103, the camera microcomputer 205 sends the registration request command ENTRYm as the data signal DCL to the lens microcomputer 111.

Next, in the step S104, the camera microcomputer 205 that has completed transmitting the registration request command ENTRYm confirms the state of the communication standby request BUSY by the lens microcomputer 111 (determines whether or not it has been released).

In the step S105, the camera microcomputer 205 that has confirmed the release of the communication standby request BUSY determines two or more command components CMDn for the custom command m by referring to the reselected table data.

Next, in the step S106, the camera microcomputer 205 sends as the data signal DCL the custom command m determined in the step S105 or two or more of command components CMDn in the determined order to the lens microcomputer 111.

Next, in the step S107, the camera microcomputer 205 determines whether all command components CMDn in the table data have been completely transmitted, by referring to the table data. When they have not yet been completely transmitted, the camera microcomputer 205 proceeds to the step S108, and returns to the step S105 by incrementing the transmission order of the next command component CMDn by one. Thus, the steps S105 to S108 are repeated until all command components CMDn in the table data are transmitted. When all command components CMDn are transmitted, the camera microcomputer 205 proceeds to the step S109.

In the step S109, the camera microcomputer 205 sends the command END that informs the lens microcomputer 111 of the registration completion of the custom command. Thereby, the registration process of one custom command is completed in the camera microcomputer 205.

Next, in the step S110, the camera microcomputer 205 determines whether the plurality of custom commands to be registered in the lens microcomputer 111 have been completely registered. When they have not yet been completely registered, the flow returns to the step S100, and the registration process of the next custom command is performed. On the other hand, when all custom commands have been completely registered, the camera microcomputer 205 ends the process.

FIG. 10 illustrates a process (lens microcomputer process 1) by which the lens microcomputer 111 registers the custom command sent from the camera microcomputer 205. In the step S200, the lens microcomputer 111 determines whether or not it has received the registration request command ENTRYm. When the lens microcomputer 111 confirms that it has received the registration request command ENTRYm, the lens microcomputer 111 informs the camera microcomputer 205 of the communication standby request BUSY.

Next, in the step S202, the lens microcomputer 111 selects the lens registration table LTBLm corresponding to the registration request command ENTRYm received in the step S200.

Next, in the step S203, the lens microcomputer 111 sets the table address for saving or storing the first command component CMDn in the custom command m sent from the camera microcomputer 205. The lens microcomputer 111 in the command reception standby state (first mode) releases the communication standby request BUSY in the step S204. In the step S205, the lens microcomputer 111 waits to receive the first command component CMDn sent from the camera microcomputer 205 after the communication standby request BUSY is released.

When the lens microcomputer 111 receives the registration request command ENTRYm from the camera microcomputer 205 in the command reception standby state, the mode is switched to the second mode in which the lens data corresponding to the received command component CMDn is not transmitted until the lens microcomputer 111 receives the registration completion command END. In the second mode, the lens microcomputer 111 sends the data (CMDn) so as to instruct the camera microcomputer 205 to confirm the reception command components CMDn. In the second mode, the lens microcomputer 111 determines the communication completion of the camera microcomputer 205 based on data sent from the camera microcomputer 205 that informs the lens microcomputer 111 of a communication data length or a transmission command number (the number of command components CMDn), and may switch to the first mode.

The lens microcomputer 111 that has received the first command component CMDn in the step S205 stores, in the step S206, the command component CMD in the table address set in the step S203 in the lens registration table LTBLm selected in the step S202. In the step S207, the lens microcomputer 111 stores the lens data DTn corresponding to the command component CMDn in the same table address. As described above, the lens data DTn stored in the lens registration table is a fixed value or a variable, and when it is the variable, the address information in the memory for storing the variable is stored.

Next, in the step S208, the lens microcomputer 111 waits for the data reception from the camera microcomputer 205, and determines whether or not the received data is the registration completion command END. When the received data is not the registration completion command END, the lens microcomputer 111 increments the arrangement number indicative of the storing table address in the lens registration table LTBLm in the step S209 and the flow moves to the step S206. Then, the steps S206 to S209 are repeated until all command components CMDn transmitted from the camera microcomputer 205 are completely received and stored and the registration completion command END is received.

When the registration completion command END is received in the step S208, the lens microcomputer 111 moves to the step S210 so as to complete registering the stored command components CMDn and the lens data DTn into the lens registration table LTBLm. At this time, the lens microcomputer 111 switches the second mode to the first mode in accordance with the registration of the registration completion command END. Thus, the lens microcomputer 111 ends the process.

FIG. 11 illustrates a transmission process of lens data (lens microcomputer process 2) when the lens microcomputer 111 receives the transmission request command GETm from the camera microcomputer 205. In the step S300, the lens microcomputer 111 determines whether it has received the transmission request command GETm. When the lens microcomputer 111 confirms that it has received the transmission request command GETm, the lens microcomputer 111 informs the camera microcomputer 205 of the communication standby request BUSY in the step S301.

Next, in the step S302, the lens microcomputer 111 selects a corresponding lens registration table LTBLm based on the transmission request command GETm received in the step S300.

Next, in the step S303, the lens microcomputer 111 obtains information of a storage destination of two or more lens data DTn stored in the selected lens registration table LTBLm. Herein, the lens data is a variable, and the variable is stored in the memory, such as a RAM, in the interchangeable lens 100.

In the step S304, the lens microcomputer 111 generates the lens data DTn using the variable read out of the memory based on the information obtained in the step S303. Moreover, in the step S305, the lens microcomputer 111 stores the generated lens data DTn in the FIFO memory as a data buffer for a data signal DLC transmission.

Next, in the step S306, the lens microcomputer 111 determines whether all lens data DTn stored in the lens registration table LTBLm have been completely generated. When all lens data DTn have not yet been completely generated, the flow moves to the step S307 so as to increment the arrangement number indicative of the table address of the lens registration table LTBLm and the flow returns to the step S304. Thereafter, the steps S304 to S307 are repeated until all lens data DTn have been completely generated.

When all lens data DTn are completely generated in the step S306, the lens microcomputer 111 releases the communication standby request BUSY in the step S308 after the transmission preparation processing of the lens data DTn becomes ready.

Next, in the step S309, the lens microcomputer 111 waits for the one-frame clock signal LCLK transmitted from the camera microcomputer 205 that has recognized a release of the communication standby request BUSY. The lens microcomputer 111 that has received the clock signal LCLK sends one lens data DTn stored in the FIFO memory in synchronization with the clock signal LCLK to the camera microcomputer 205.

Next, in the step S310, the lens microcomputer 111 determines whether all lens data DTn stored in the FIFO memory has been completely transmitted. When lens data is left untrasmitted, the flow returns to the step S309 so as to wait for the next clock signal LCLK transmitted from the camera microcomputer 205. Thereafter, the lens microcomputer 111 repeats the steps S309 and S310 until all lens data DTn stored in the FIFO memory are completely transmitted. Due to this repetition, all lens data DTn corresponding to the custom command m (transmission request command GETm) are continuously transmitted from the lens microcomputer 111 to the camera microcomputer 205 in the order designated by the custom command m (command component CMDn).

In the step S310, when all lens data DTn in the FIFO memory are completely transmitted, the lens microcomputer 111 ends the process.

As described above, this embodiment can propagate a large amount of data from the interchangeable lens 100 to the camera body 200 without delay. In addition, the data communication with a new data series can be easily performed between the camera body 200 and the interchangeable lens 100.

According to this embodiment, in the continuous communication protocol, the camera microcomputer 205 sends the transmission request command to the lens microcomputer 111, and the lens microcomputer 111 continuously sends two or more lens data to the camera microcomputer 205. However, in the continuous communication protocol, the command which the camera microcomputer 205 sends to the lens microcomputer 111 is not limited to an acquisition request command of the lens data. For example, a drive control command that instructs a drive control of the interchangeable lens 100, and a setting command that sets an operation or mode of the interchangeable lens 100 may be used.

This embodiment describes the clock synchronous communication, but the communication method is not limited to this embodiment, and the lens data communication may use the custom command and a variety of communication method, such as an asynchronous communication, a parallel communication, and a radio communication.

Other Examples

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2015-133759, filed on Jul. 2, 2015, which is hereby incorporated by reference wherein in its entirety.

REFERENCE SIGNS LIST 100 interchangeable lens
111 lens microcomputer
200 camera body
205 camera microcomputer

The invention claimed is:

1. An image capturing apparatus configured to communicate with a lens apparatus detachably attached to the image capturing apparatus, the image capturing apparatus comprising:
   a command registration requester configured to send to the lens apparatus command registration information indicative of a combination and a transmission order of a plurality of lens data to be transmitted from the lens apparatus to the image capturing apparatus; and
   a transmission requester configured to request the lens apparatus to transmit the plurality of lens data in the transmission order based on the command registration information.

2. The image capturing apparatus according to claim 1, wherein the lens data contains at least one of position information of a lens included in the lens apparatus, and information indicative of a drive state of an actuator included in the lens apparatus.

3. The image capturing apparatus according to claim 1, wherein the command registration requester generates the command registration information, and transmits the command registration information and a registration request command to the lens apparatus, and
   wherein the transmission requester requests the lens apparatus that has registered the command registration information in accordance with the registration request command, to send the plurality of lens data in the transmission order based on the command registration information by sending a transmission request command corresponding to the command registration information to the lens apparatus.

4. The image capturing apparatus according to claim 1, wherein the image capturing apparatus can communicate the lens data with the lens apparatus using an individual transmission mode for requesting an individual transmission of the lens data and a non-individual transmission mode for requesting a non-individual transmission of the lens data, and
   wherein the transmission requester individually sends an individual transmission request command with the individual transmission mode to the lens apparatus, and requests the lens apparatus to individually send the lens data corresponding to the individual transmission request command.

5. The image capturing apparatus according claim 4, wherein the lens apparatus stores lens specific information that is different for each lens apparatus,
   wherein the image capturing apparatus generates the command registration information based on the lens specific information obtained from the lens apparatus, and
   wherein the lens specific information contains at least one of information indicative of the individual transmittance request command acceptable to the lens apparatus, information indicative of a function of the lens apparatus, and information indicative of the lens data stored in the lens apparatus.

6. A lens apparatus detachably attached to the image capturing apparatus and communicate with the image capturing apparatus, the lens apparatus comprising:
   a registration unit configured to register command registration information indicative of a combination and a transmittance order of a plurality of lens data to be transmitted to the image capturing apparatus in response to the command registration information received from the image capturing apparatus; and
   a data transmitter configured to transmit the plurality of lens data to the image capturing apparatus in the transmission order based on the command registration information in response to a transmission request command corresponding to the command registration information received from the image capturing apparatus.

7. The lens apparatus according to claim 6, wherein the lens data contains at least one of position information of a lens included in the lens apparatus, and information indicative of a drive state of an actuator included in the lens apparatus.

8. The lens apparatus according to claim 6, wherein the registration unit registers the command registration information in response to the command registration information and a registration request command received from the image capturing apparatus, and
   wherein the data transmitter sends the plurality of lens data to the image capturing apparatus in the transmission order based on the command registration information in response to the transmission request command received from the image capturing apparatus.

9. The lens apparatus according to claim 6, wherein the lens apparatus can communicate with the camera apparatus using an individual transmission mode for requesting an individual transmission of the lens data, and a non-individual transmission mode for requesting a non-individual transmission of the lens data, and
   wherein in the individual transmission mode, the data transmitter individually transmits, when receiving an individual transmission request command, the lens data corresponding to the individual transmission request command to the image capturing apparatus.

10. The lens apparatus according to claim 9, wherein the lens apparatus stores lens specific information that is different for each lens apparatus and used to generate the command registration information, and the lens apparatus transmits the lens specific information to the image capturing apparatus, and
wherein the lens specific information contains at least one of information indicative of the individual transmittance request command acceptable to the lens apparatus, information indicative of a function of the lens apparatus, and information indicative of the lens data stored in the lens apparatus.

11. The lens apparatus according to claim 6, wherein the data communication form transmitted by the data transmitter includes a command frame having a communication standby request of which the lens apparatus informs the image capturing apparatus is added, and a data frame having no communication standby request.

12. The lens apparatus according to claim 6, wherein in a case where the registration unit receives the command registration information from the image capturing apparatus in a first mode that is a standby state of a command received from the image capturing apparatus, the registration unit does not transmit the lens data corresponding to the command registration information and switches the first mode to a second mode used to transmit data that enables the image capturing apparatus to confirm receiving the lens data corresponding to the command registration information, until the registration unit receives a registration completion command from the image capturing apparatus, and
wherein the registration unit switches from the second mode to the first mode in response to the registration completion command received from the image capturing apparatus.

13. The lens apparatus according to claim 6, wherein in a case where the registration unit receives the command registration information from the image capturing apparatus in a first mode that is a standby state of a command received from the image capturing apparatus, the registration unit does not transmit the lens data corresponding to the command registration information and switches the first mode to a second mode used to transmit data that enables the image capturing apparatus to confirm receiving the lens data corresponding to the command registration information, until the registration unit receives a registration completion command from the image capturing apparatus, and
wherein the registration unit determines a communication completion from the image capturing apparatus based on data that is transmitted from the image capturing apparatus and configured to inform the lens apparatus of a communication data length or a command number, and switches from the second mode to the first mode.

14. An image capturing system that includes an image capturing apparatus, and a lens apparatus detachably attachable to the image capturing apparatus,
wherein the image capturing apparatus includes a command registration requester configured to send to the lens apparatus command registration information indicative of a combination and a transmission order of a plurality of lens data to be transmitted from the lens apparatus to the image capturing apparatus, and a transmission requester configured to request the lens apparatus to transmit the plurality of lens data in the transmission order based on the command registration information, and
wherein the lens apparatus includes a registration unit configured to register the command registration information in response to the command registration information received from the image capturing apparatus, and a data transmitter configured to transmit the plurality of lens data to the image capturing apparatus in the transmission order based on the command registration information in response to a transmission request command corresponding to the command registration information received from the image capturing apparatus.

15. A non-transitory recording medium which stores a data communication process program as a computer program that enables a computer in an image capturing apparatus to which a lens apparatus is detachably attached, to implement a data communication process, wherein the data communication process includes:
sending command registration information indicative of a combination and a transmission order of a plurality of lens data to be transmitted from the lens apparatus to the image capturing apparatus; and
receiving the plurality of lens data sent from the lens apparatus in the transmission order based on the command registration information.

16. A non-transitory recording medium which stores a data communication process program as a computer program that enables a computer in a lens apparatus detachably attachable to an image capturing apparatus, to implement a data communication process, wherein the data communication process includes:
registering command registration information indicative of a combination and a transmittance order of a plurality of lens data to be transmitted to the image capturing apparatus in response to the command registration information received from the image capturing apparatus; and
transmitting the plurality of lens data to the image capturing apparatus in the transmission order based on the command registration information in response to a transmission request command corresponding to the command registration information received from the image capturing apparatus.

17. The image capturing apparatus according to claim 1, wherein the plurality of lens data includes a combination of two or more types of lens data.

18. The lens apparatus according to claim 6, wherein the plurality of lens data includes a combination of two or more types of lens data.

* * * * *